(12) United States Patent
Saraya et al.

(10) Patent No.: US 11,122,199 B2
(45) Date of Patent: Sep. 14, 2021

(54) METHODS FOR ADJUSTING CHARACTERISTICS OF PHOTOGRAPHS CAPTURED BY ELECTRONIC DEVICES AND RELATED PROGRAM PRODUCTS

(71) Applicant: International Business Machines Corporation, Armonk, NY (US)

(72) Inventors: Siddharth Kumar Saraya, Raniganj (IN); Gopal Kumar Bhageria, Kolkata (IN); Nakul Saligram, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/749,047

(22) Filed: Jan. 22, 2020

(65) Prior Publication Data
US 2021/0227128 A1   Jul. 22, 2021

(51) Int. Cl.
*H04N 5/232* (2006.01)
(52) U.S. Cl.
CPC ..... *H04N 5/23222* (2013.01); *H04N 5/23216* (2013.01); *H04N 5/232939* (2018.08)
(58) Field of Classification Search
CPC .......... H04N 5/23222; H04N 5/23216; H04N 5/232939
See application file for complete search history.

(56) References Cited

U.S. PATENT DOCUMENTS

2008/0095434 A1* 4/2008 Funayama ......... H04N 21/8153
                                                       382/172
2015/0084984 A1* 3/2015 Tomii ..................... G06T 11/60
                                                       345/619

* cited by examiner

*Primary Examiner* — Ahmed A Berhan
(74) *Attorney, Agent, or Firm* — Yee & Associates, P.C.

(57) ABSTRACT

Methods and program products for adjusting characteristics of photographs captured by electronic devices. The disclosed methods may include identifying a location of an electronic device at a detectable time. The electronic device may include a camera configured to capture a photograph at the location. The method may also include analyzing environmental data relating to the identified location, analyzing historical data for a collection of previously captured photographs at the identified location and providing at least one notification on the electronic device based on the analyzed environmental data and/or the analyzed historical data. Additionally, the method may include adjusting at least one camera setting for the camera of the electronic device based on the analyzed environmental data and the analyzed historical data.

14 Claims, 21 Drawing Sheets

METHODS FOR ADJUSTING CHARACTERISTICS OF PHOTOGRAPHS CAPTURED BY ELECTRONIC DEVICES AND RELATED PROGRAM PRODUCTS

TECHNICAL FIELD

The disclosure relates generally to electronic devices, and more particularly to methods and program products for adjusting characteristics of photographs captured by electronic devices.

BACKGROUND

Small cameras and/or camera systems include in portable electronic devices, such as tablets or mobile phones, continue to improve over time. Specifically, photograph quality and/or capabilities for small camera systems included in portable electronic devices continue to provide improved, high quality photographs. As such, portable electronic devices including these camera systems are being user's primary device for capturing photographs and/or videos. That is, users are no longer carrying separate camera devices (e.g., digital cameras), but rather, are relying solely on their portable electronic devices for photograph and/or video documentation. For example, when a user visits a location or landmark on a trip, the user may typically only bring their portable electronic device to capture photographs because of the camera systems improved capabilities and/or the user no longer needs to carry a separate camera device. Additionally, taking photographs with portable electronic devices is the easiest way for a user to publish and/or "post" photographs to social media sites and/or applications, which may be stored, run and/or interact directly on the portable electronic device.

However, capturing a photograph with the portable electronic device does include some difficulties. Specifically, because of the design of portable electronic devices, it may be difficult to properly hold, align and/or capture a photograph with the electronic device. This may be especially true when a user is attempting to capture a "selfie" or a "groufie." That is, users taking selfies or groufies typically have a hard time controlling the electronic device and/or aligning the electronic device to capture a desirable photograph. Additionally, dependent upon the position of each user in the captured selfie, and/or the position of the electronic device, portions of the user(s) and/or the landmark that is trying to be captured in the photograph may be cut-out and/or distorted (e.g., larger faces for users who are closer to the electronic device). While the image qualities and/or characteristics of the photograph captured by the electronic device may be of high quality, the users may be dissatisfied with the photograph because of the difficulties of achieving a satisfactory selfie or groufie.

SUMMARY

Aspects of the disclosure provide methods and program products for adjusting characteristics of photographs captured by electronic devices.

A first aspect discloses a method including: identifying a location of an electronic device at a detectable time, the electronic device including a camera configured to capture a photograph at the location; analyzing environmental data relating to the identified location; analyzing historical data for a collection of previously captured photographs at the identified location; providing at least one notification on the electronic device based on at least one of: the analyzed environmental data, or the analyzed historical data; and adjusting at least one camera setting for the camera of the electronic device based on the analyzed environmental data and the analyzed historical data.

A second aspect discloses a computer program product stored on a computer readable storage medium, which when executed by a computing system, adjusts a characteristic of a photograph captured by an electronic device, the program product including: program code that identifies a location of an electronic device at a detectable time, the electronic device including a camera configured to capture a photograph at the location; program code that analyzes environmental data relating to the identified location; program code that analyzes historical data for a collection of previously captured photographs at the identified location; program code that provide at least one notification on the electronic device based on at least one of: the analyzed environmental data, or the analyzed historical data; and program code that adjust at least one camera setting for the camera of the electronic device based on the analyzed environmental data and the analyzed historical data.

A third aspect discloses a computerized method that adjusts a characteristic of a photograph captured by an electronic device, the method including: identifying a location of an electronic device at a detectable time, the electronic device including a camera configured to capture a photograph at the location; analyzing environmental data relating to the identified location; analyzing historical data for a collection of previously captured photographs at the identified location; providing at least one notification on the electronic device based on at least one of: the analyzed environmental data, or the analyzed historical data; and adjusting at least one camera setting for the camera of the electronic device based on the analyzed environmental data and the analyzed historical data.

The illustrative aspects of the present disclosure solve the problems herein described and/or other problems not discussed.

BRIEF DESCRIPTION OF THE DRAWINGS

These and other features of this invention will be more readily understood from the following detailed description of the various aspects of the invention taken in conjunction with the accompanying drawings in which.

Figure 1:
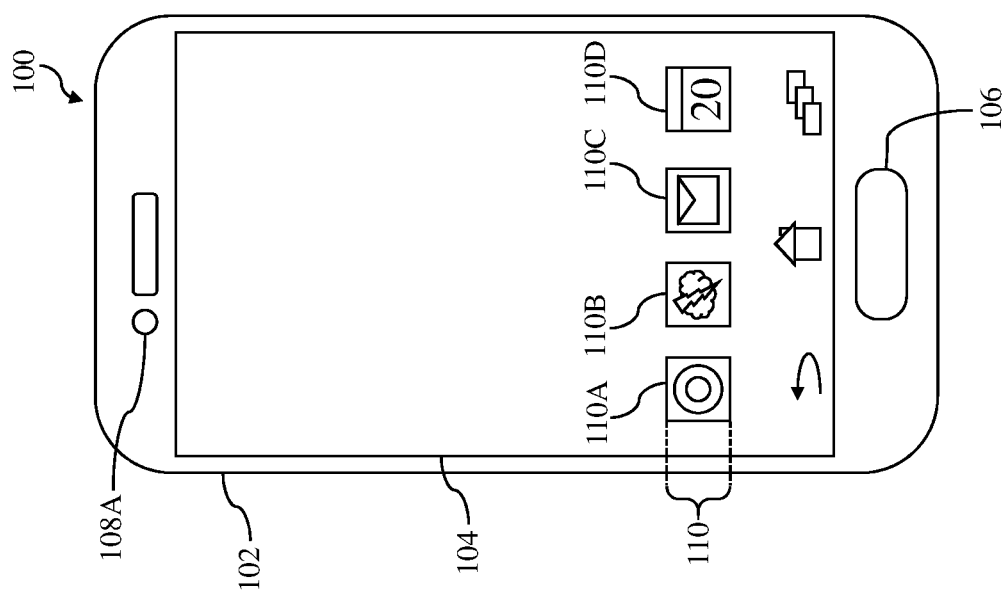
FIG. 1 depicts an illustrative front view of an electronic device including a touch display, according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to electronic devices, and more particularly to methods and program products for adjusting characteristics of photographs captured by electronic devices.

These and other embodiments are discussed below with reference to FIGS. 1-19. However, those skilled in the art will readily appreciate that the detailed description given herein with respect to these Figures is for explanatory purposes only and should not be construed as limiting.

Figure 2:
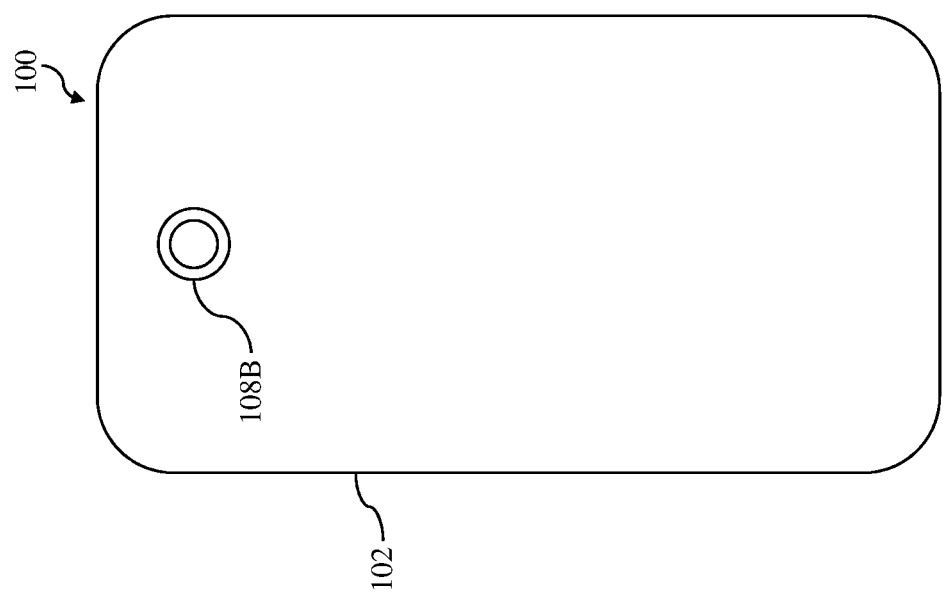
FIG. 2 depicts an illustrative back view of the electronic device of FIG. 1, according to embodiments.

FIGS. 1 and 2 show illustrative front and back views, respectively, of an electronic device 100, according to embodiments. As discussed in detail herein, electronic device 100, and its processing/computing device(s) and/or component(s) included therein, may be configured to adjust characteristics of photographs captured by electronic device 100 based on predetermined data. Adjusting characteristics of photographs captured by electronic device 100 may improve the quality of user-captured photos on electronic device 100.

In the illustrated non-limiting example shown in FIGS. 1 and 2, electronic device 100 is implemented as a smart telephone. In other non-limiting examples, electronic device 100 can be implemented as any suitable device including, but not limited, a laptop or desktop computer, a tablet computing device, a gaming device, a display, a digital music player, a wearable computing device or display such as a watch, and other suitable type of electronic device that include a touch display and icons associated with interactive applications, commonly known as "Apps," and/or documents (e.g., word-processing documents) of electronic device 100.

Electronic device 100 includes a casing 102 at least partially surrounding a touch display 104 and one or more buttons 106, as shown in FIG. 1. Casing 102 can form an outer surface or partial outer surface and protective case for the internal components of electronic device 100 (see, FIG. 19), and may at least partially surround touch display 104. Casing 102 can be formed of one or more components operably connected together, such as a front piece and a back piece. Alternatively, casing 102 can be formed of a single piece operably connected to the touch display 104.

Touch display 104 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. As discussed herein, button 106 may be utilized by electronic device 100 to provide user input and/or allow the user to interact with the various functions of electronic device 100.

Although not shown, electronic device 100 may also include various notification components or devices. As discussed herein, the various notification components or devices may be configured to provide notifications, warnings and/or indicator signals to a user of electronic device 100 when user is capturing a photograph using electronic device 100. In non-limiting examples, the notification components or devices of electronic device 100 may include any components or devices that may be configured to provide user with a haptic notification (e.g., haptic module or driver), an auditory notification (e.g., speaker system), a visual notification (e.g., light), and/or any other suitable notification and/or sensory cue.

As shown in FIGS. 1 and 2, electronic device 100 may also include at least one camera 108A, 108B (collectively, "cameras 108"). Specifically, and in the non-limiting example shown in FIGS. 1 and 2, a first camera 108A may be positioned on a front side of electronic device 100 (see, FIG. 1) and a second camera 108B position on a back side of electronic device 100 (see, FIG. 2). Second camera 108B position on the back side of electronic device 100 may also be positioned opposite touch display 104. As discussed herein, cameras 108 may display a viewed, real-time and/or captured image on touch display 104 of electronic device 100. Cameras 108 may be any suitable camera component, device and/or system that may be configured to capture images and/or videos on electronic device 100. It is understood that the number of cameras 108A, 108B included within electronic device 100 is merely illustrative. As such, electronic device 100 may include more or less cameras 108 than the number of cameras 108 depicted in FIGS. 1 and 2.

Electronic device 100 may also include a plurality of icons 110A-110D (collectively, "icons 110"). Specifically, touch display 104 may provide, display, and/or visually depict a plurality of icons 110, where each icon of the plurality of icons 110 may be associated with a an application (commonly referred to as "App") and/or a document included within electronic device 100. The applications associated with the plurality of icons 110 may be stored within any suitable memory or storage device (internal, external, cloud-based and so on) on and/or associated with electronic device 100 and may be configured to be interacted with by a user of electronic device 100 for providing communication capabilities and/or information to the user. Additionally as discussed herein, the applications may be interacted with, opened and/or accessed when a user of electronic device 100 engages, activates and/or interacts (e.g., taps or clicks) with the icon 110 associated with a specific application. The applications associated with the plurality of icons 110 may include messaging applications (e.g., Short Message Service (SMS), Multimedia Messaging Services (MMS), electronic mail (e-mail) and so on), communication applications (e.g., telephone, video-conferencing, and so on), multimedia applications (e.g., cameras, picture libraries, music libraries, video libraries, games and so on), information applications (e.g., global positioning systems (GPS), weather, internet, news and so on), and any other suitable applications that may be included within electronic device 100. In the non-limiting example shown in FIG. 1, electronic device 100 may include icon 110A associated with a camera application that interacts and/or controls cameras 108 of electronic device 100, icon 110B associated with a weather application, icon 110C associated with an e-mail application and icon 110D associated with a calendar or planner application. As discussed herein, icon 110A associated with the camera application and/or cameras 108 of electronic device 100 may be utilized by a user, and/or may interact with other applications associated with the plurality of icons 110 of electronic device 100, to improve photographs captured using electronic device 100.

The number of icons 110 visible on touch display 104 may be limited by a variety of parameters including, but not limited to, a size or dimension of touch display 104, a size or dimension of the plurality of application icons 110, operational system preferences for electronic device 100, a user-specified preference for electronic device 100 and any other suitable parameter that may limit the number of application icons 110 visible on touch display 104. Additionally, it is understood that the number of icons 110 included within electronic device 100 and/or visible on touch display 104 of electronic device 100 is merely illustrative. As such, electronic device 100 may include more or less icons 110 and/or touch display 104 may provide, display, and/or visually depict more or less icons 110 than the number of icons 110 depicted in FIG. 1. Additionally, although only a single row of icons 110 is depicted, it is understood that touch display 104 may provide, display, and/or visually depict more rows of icons 110 than the number of rows of icons 110 depicted in FIG. 1.

Figure 3:
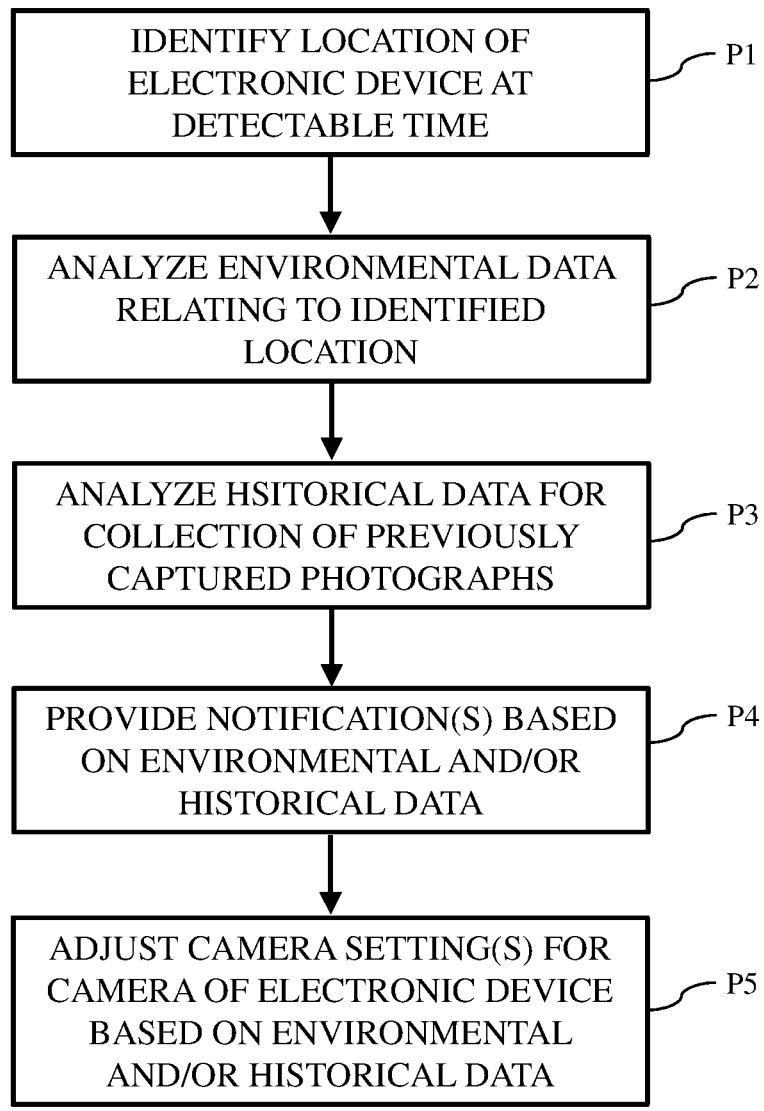
FIG. 3 depicts a flow chart of an example process for adjusting characteristics of a photograph captured by the electronic device of FIG. 1 at an identified location, according to embodiments.

FIG. 3 shows a flow diagram illustrating non-limiting example processes of adjusting characteristic(s) of a photograph captured electronic device 100. These processes can be performed, e.g., by at least one computing device included within electronic device 100 (see, FIG. 21), as described herein. In other cases, these processes can be performed according to a computer-implemented method of adjusting characteristic(s) of a photograph captured by electronic device 100. In still other embodiments, these processes can be performed by executing computer program code on the computing device(s) included in electronic device 100, causing the computing device(s) to adjust characteristic(s) of a photograph captured by electronic device 100.

In process P1, a location of an electronic device may be identified. Specifically, the location of the electronic device may be identified at a detectable and/or determinable time. Identifying the location of the electronic device at the detectable time may include determining the location of the electronic device in real-time, or alternatively, at a scheduled time based on predetermined, electronic device data. The electronic device may include a camera configured to capture a photograph at the (identified) location.

In process P2, environmental data may be analyzed. The analyzed environmental data may be related to the identified location of the electronic device. Specifically, the environmental data that may be analyzed may be data specifically related to and/or based on the identified location of the electronic device. Analyzing the environmental data may include determining weather information relating to the location of the electronic device at the detectable time. The weather information may include, but is not limited to, weather conditions (e.g., sunny, raining, snowing and so on) for the identified location at the detectable time, chance of precipitation for the identified location at the detectable time, sun or light index (e.g., sunny, partly cloudy, overcast, night/dark and so on) for the identified location at the detectable time, temperature for the identified location at the detectable time, and so on.

In process P3, historical data may be analyzed. Specifically, historical data for a collection of previously captured photographs at the identified location may be analyzed. Analyzing the historical data for the collection of previously captured photographs at the identified location may include evaluating the collection of previously captured photographs at the identified location based on user-interaction data (e.g., social media-based "views," "likes," "shares," "reposts," "comments" and so on) with the collection of previously captured photographs, and/or environmental data (e.g., weather information) of the collection of previously captured photographs. Analyzing the historical data for the collection of previously captured photographs at the identified location may also include identifying at least one desirable photograph of the collection of previously captured photographs at the location, and detecting various characteristics and/or settings relating to the identified, desirable photograph(s). Specifically, a location characteristics (e.g., position of the electronic device with respect to a photograph focal point or landmark at the identified location) of the identified, desirable photograph(s) may be detected, user-based characteristics (e.g., positioning or ordering of users within the photograph(s), position of users with respect to photograph focal point or landmark at the identified location, and so on) of the identified, desirable photograph(s) may be detected and/or camera settings (e.g., brightness, sharpness, contrast, filters and so on) of the identified, desirable photograph(s) may be detected.

In process P4, a notification(s) may be provided on the electronic device. The provided notification(s) may be provided on the electronic device based on the analyzed environmental data and/or the analyzed historical data. Providing the notification(s) on the electronic device may include providing directions to a predetermined photograph spot within the identified location, providing instructions for adjusting the position and/or location of the electronic device, and/or providing instructions for adjusting a user characteristic for a user(s) to be captured in the photograph at the identified location. Additionally, providing instructions for adjusting the user characteristic for the user(s) to be captured in the photograph at the identified location may include recommending a color(s) for an article(s) of clothing to be worn by the user(s), recommending an adjustment in position for the user(s) and/or recommending an adjustment in an appearance (e.g., facial expression, user-camera focus, user action and so on) for the user(s).

In process P5, a camera setting(s) for the camera of the electronic device may be adjusted. The camera setting(s) for the camera of the electronic device may be adjusted based on the analyzed environmental data and/or the analyzed historical data. Adjusting the camera setting(s) may include adjusting image factors (e.g., sharpness, brightness, color, contrast and so on) for the camera of the electronic device and/or applying a filter to the camera of the electronic device. Adjusting the camera setting(s) may ultimately improve the photograph taken by the camera of the electronic device with the adjusted camera setting(s) and/or improve user satisfaction with the photograph.

Figure 4:
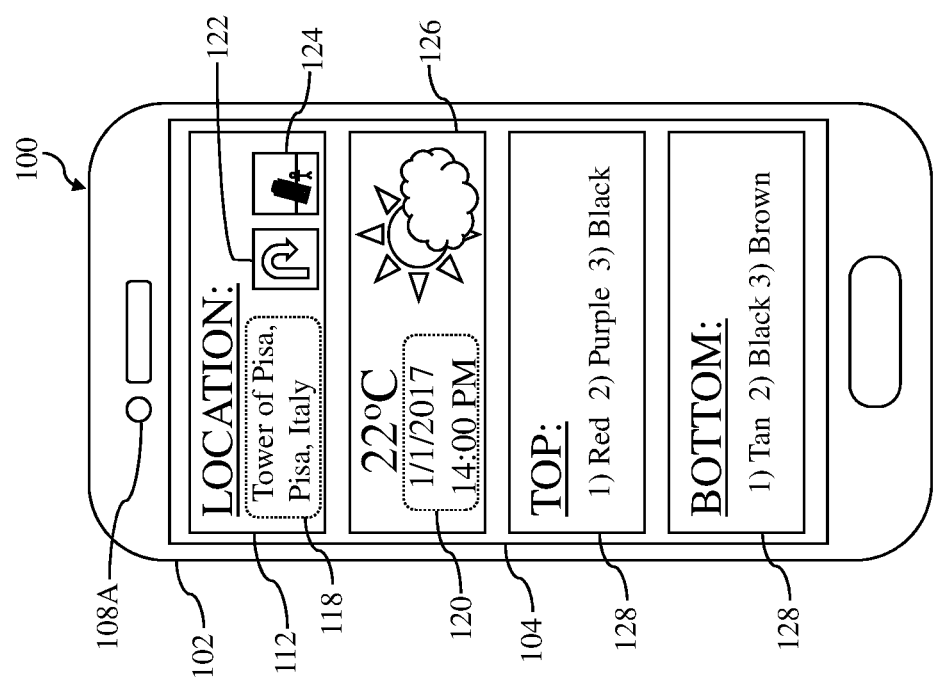
FIG. 4 depicts an illustrative front view of the electronic device of FIG. 1 displaying location information, environmental data and notifications, according to embodiments.

FIG. 4 depicts a non-limiting example of electronic device 100 configured to adjust characteristic(s) of a photograph captured by camera 108 of electronic device 100. The characteristic(s) of the photograph captured by camera 108 of electronic device 100 may be adjusted by the processes P1-P5 discussed herein with respect to FIG. 3. It is understood that similarly numbered and/or named components may function in a substantially similar fashion. Redundant explanation of these components has been omitted for clarity.

Turning to FIG. 4, electronic device 100 is shown including location information and photograph information for the location. Specifically, FIG. 4 depicts electronic device 100 including various forms of information displayed on touch display 104, where the various forms of information relates to an identified location where electronic device 100 may take a photograph, and recommended clothing for the user to wear for the photograph to be taken at the identified location. The displayed information may be provided when opening a camera application of electronic device 100 that may control camera(s) 108 (see, icon 110A; FIG. 1). As discussed in detail below, the displayed information on touch display 104 of electronic device 100 may obtained, identified, analyzed and/or utilized to adjust characteristic(s) of a photograph (see, FIG. 19) captured by camera 108 of electronic device 100.

As shown in FIG. 4, electronic device 100 may display location data or information 112. Location data 112 may include an identified location 118 (hereafter, "location 118") for electronic device 100 including camera 108. Location 118 may include a location, place and/or landmark in which a user of electronic device 100 may utilized camera 108 to capture a photograph. That is, location 118 may be a detected, identified and/or predetermined location in which a user may use and/or interact with electronic device 100 to capture a photograph at a detectable time 120 (e.g., real-time or scheduled time). Location 118 may be identified and/or determined by electronic device 100, and specifically computing device(s) of electronic device 100 (see, FIG. 21), using various processes and/or information from the user and/or electronic device 100. In a non-limiting example, location 118 at detectable time 120 may be identified and/or determined in real-time (e.g., instantaneously) using information obtained from the user and/or the electronic device. For example, the user may directly input location 118 into the location data 112 using touch display 104. In other examples, the user may interact with electronic device 100, and the various applications included within electronic device 100, to identify and/or provide location 118. This may include, but is not limited to requesting directions to location 118 using GPS or map Application, and/or inputting a status or "checking-in" at location 118 on a social media application. In an additional example, location 118 may be identified and/or determined in real-time (e.g., instantaneously) using electronic device data. That is, electronic device 100 may obtain, determined and/or identify location 118 by detecting a real-time position of electronic device based on data stored, detected, determined, obtained and/or calculated from electronic device 100. The electronic device data may include, but is not limited to a real-time position of electronic device 100 determined using a GPS application, regardless of a user input.

In another non-limiting example, location 118 at detectable time 120 may be identified and/or determined at a scheduled time. Determining the location 118 at a scheduled time may be based on electronic device information and/or user input to electronic device 100. That is, using information obtained from the electronic device, location 118 may be identified and/or determined at a future, scheduled time (e.g., detectable time). For example, the user may discuss a future or scheduled event or trip to location 118 in a messaging application (see, icon 110C; FIG. 1) or on a social media application, may directly input a future or scheduled event at location 118 on a calendar application (see, icon 110D; FIG. 1) and/or may utilize a travel-based application to store electronic travel tickets (e.g., plane ticket, subway ticket) on electronic device 100 for a future or scheduled event or trip to location 118. Electronic device 100, and specifically computing device(s) of electronic device 100 (see, FIG. 21), may obtain, detect and/or utilize this information to identify and/or determine location 118 at scheduled, detectable time 120. Additionally, and as similarly discussed herein, a user of electronic device 100 may directly input detectable time 120 as a scheduled or future time into electronic device 100. As discussed herein, location data 112, and specifically, identified location 118, may be utilized by electronic device 100 for adjusting characteristic(s) of a photograph captured by camera 108 of electronic device 100.

As shown in FIG. 4, location information 112 displayed on touch display 104 of electronic device 100 may include additional information relating to identified location 118. Specifically, location information 112 may include selectable directions 122 to and/or around location 118. In a non-limiting example where electronic device 100 is not yet at or in the vicinity of location 118, selectable directions 122 may provide directions to and/or a map for getting to location 118. In another non-limiting example where electronic device 100 is at and/or within the vicinity of location 118, selectable directions 122 may provide directions to and/or a map showing various predetermined photograph spots or areas (see, FIGS. 7 and 8) within location 118. As discussed in detail below, the predetermined photograph spots within location 118 may be predetermined areas of location 118 that ensure camera 108 of electronic device 100 to capture improved, optimized and/or desirable photographs based on analyzed historical data. Selectable directions 122 of location information 112 may be displayed to a user on touch display 104 of electronic device 100. It is understood that the directions and/or map provided by selectable directions 122 may be identified, generated and/or displayed on touch display 104 using any suitable application and/or system included within electronic device 100 including, but not limited to, a GPS application.

Additionally, location information 112 may also include at least one desirable photograph 124. Desirable photograph(s) 124 may be identified, selected and/or based on a collection of previously captured photographs taken at location 118. That is, and as discussed below, desirable photograph(s) 124 may be identified after analyzing historical data for the collection of previously captured photographs taken at location 118. The collection of previously captured photographs taken at location 118 may be identified, collected, and/or compiled using electronic device 100, applications on electronic device 100 and/or searching or mining various databases and/or the internet for photographs previously captured at location 118. For example, the collection of previously captured photographs taken at location 118 may be obtained from various social media applications (e.g., Facebook®, Instagram®, Twitter® and so on) and/or the internet, and each photograph may include historical data (e.g., metadata) that indicates the photographs were previously taken at location 118. Desirable photograph(s) 124 may be made visible on touch display 104, interacted with, and/or scrolled through by a user of electronic device 100. Additionally, and as discussed below, a user may select specific photograph(s) of desirable photograph(s) 124, and detected and/or identified information, data and/or parameters of the selected photograph(s) may be utilized to adjust characteristics of a photograph captured by camera 108 of electronic device 100 at location 118.

Analyzing the historical data for the collection of previously captured photographs taken at location 118 may include evaluating the collection of previously captured photographs at location 118. Evaluating the collection of previously captured photographs at location 118 may be based on user-interaction data, environmental data and/or the historical data for the collection of previously captured photographs. The user-interaction data may pertain to how a user interacts, positively or negatively, to a photograph in the collection of previously captured photographs. For example, if a photograph of the collection of previously captured photographs is obtained from a social media application, the user-interaction data may include, but is not limited to, the number of "likes," the number of views, the number of comments, the number of shares and other interactions a social media user may perform with respect to the photograph. Environmental data may relate to weather information obtained from evaluating the collection of previously captured photographs. For example, environmental data may pertain to whether a photograph of the collection of previously captured photographs was taken during a rainy season for location 118 and/or it is determined that it was sunny at the time the photograph of the collection of previously captured photographs was captured at location 118. Additionally, and as discussed below, environmental data may be determined by researching and/or obtaining weather records or past weather conditions for location 118 based on historical data for the photograph of the collection of previously captured photographs. The historical data may relate to time and/or date information for the photograph obtained when evaluating the collection of previously captured photographs.

Once evaluated, desirable photograph(s) 124 may be identified for location 118. Specifically, desirable photograph(s) 124 may be identified based on evaluating user-interaction data, environmental data and/or historical data for the collection of previously captured photographs taken at location 118. Desirable photograph(s) 124 may also be identified by comparing the evaluated user-interaction data, environmental data and/or historical data for the collection of previously captured photographs taken at location 118, with user-interaction threshold, environmental data and/or detectable time 120 for electronic device 100 at location 118. That is, the past or previously determined information or data (e.g., user-interaction data, environmental data and/or historical data) for the collection of previously captured photographs taken at location 118 may be compared to the present (e.g., real-time) or future (e.g., scheduled time) information or data (e.g., user-interaction threshold, environmental data and/or detectable time 120) relating to electronic device 100 that may capture a photograph at location 118 at detectable time 120. Continuing with the non-limiting examples above, a photograph of the collection of previously captured photographs taken at location 118 may only be included and/or identified as desirable photograph(s) 124 if the photograph includes over 50 "likes" or has been viewed over 100 times (e.g., user-interaction data, user-interaction threshold). In another non-limiting example, a photograph of the collection of previously captured photographs taken at location 118 may only be included and/or identified as desirable photograph(s) 124 if the environmental data or weather information (e.g., sunny) of the photograph is substantially similar to the environmental data for location 118 at detectable time 120 (e.g., sunny). In other non-limiting examples, a photograph of the collection of previously captured photographs taken at location 118 may only be included and/or identified as desirable photograph(s) 124 if the historical data (e.g., date and/or time) of the photograph is substantially similar to detectable time 120 for electronic device 100 at location 118 (e.g., date and/or time).

Analyzing historical data for the collection of previously captured photographs taken at location 118 may include additional processes. That is, once desirable photograph(s) 124 are identified, desirable photograph(s) 124 may be further analyzed to identify, obtain, and/or detect additional information, data and/or parameters relating to desirable photograph(s) 124. For example, desirable photograph(s) 124 may be utilized and/or further analyzed to identify predetermined photograph spots (see, FIGS. 7 and 8) within location 118, detect user characteristics (see, FIGS. 15-18) for users of desirable photograph(s) 124 and/or identify camera settings (e.g., brightness, sharpness, contrast, filters and so on) for desirable photograph(s) 124. As discussed in detail herein, the identified predetermined photograph spots, detected user characteristics and/or identified camera settings based on desirable photograph(s) 124 may be utilized to adjust characteristics of a photograph captured at location 118 using camera 108 of electronic device 100, and ultimately improve the photograph and/or improve user satisfaction with the photograph.

As shown in FIG. 4, electronic device 100 may display detectable time 120 along with environmental data 126. As discussed herein, environmental data 126 may relate to weather information for location 118 at detectable time 120. In a non-limiting example shown in FIG. 4, environmental data 126 may include a graphic or illustration representing the weather condition (e.g., sunny, cloudy, raining, and so on) at location 118 at detectable time 120, as well as, a temperature for location at detectable time 120. As discussed herein, environmental data 126 depicted on touch display 104 of electronic device 100 may be the current or real-time weather information for location 118 when detectable time 120 is current or real-time. Alternatively, environmental data 126 may be future or predicted weather information for location 118 when detectable time 120 is a future or scheduled time. Environmental data 126 may be obtained and/or determined using electronic device data. For example, environmental data 126 for location 118 at detectable time 120 may be obtained, predicted and/or determined using a weather application (see, icon 110B; FIG. 1) stored on and/or included within electronic device 100. As discussed herein, environmental data 126 may be based on location 118 at detectable time 120. As such, it is understood that environmental data 126 may change when location 118 and/or detectable time 120 are changed and/or altered.

Electronic device 100 may also be configured to provide at least one notification 128 to a user. That is, electronic device 100 may be configured to provide various notification(s) 128 to a user of electronic device 100 pertaining to various aspects of capturing a photograph at location 118 at detectable time 122. In a non-limiting example shown in FIG. 4, electronic device 100 may provide notifications 128 relating to articles of clothing to be worn by the user in the photograph to be captured at location 118. Specifically, electronic device 100 may provide two distinct notifications 128 that may recommend at least one color for articles of clothing (e.g., top, bottom) to be worn by at least one user that may be in the photograph captured by electronic device 100 at location 118 at detectable time 122. In the non-limiting example shown in FIG. 4, notifications 128 may provide three distinct options and/or colors for the top/shirt and bottom/pants to be worn by a user of electronic device 100. Various other notification(s) provided to the user and/or electronic device 100 are discussed in detail below. Additionally, it is understood that the number of notifications 128 provided by electronic device 100 are merely illustrative. As such, electronic device 100 may include more or less notifications than the number of notifications depicted in FIG. 4.

Notification(s) 128 may be based on a variety of information and/or data that is utilized to adjust characteristics of a photograph taken at location 118 by electronic device 100, as discussed herein. That is, notification(s) 128 may be based on electronic device data, location data 112, analyzed environmental data 126 and/or desirable photograph(s) 124 and the associated, analyzed or evaluated data (user-interaction data, environmental data and/or historical data) for desirable photograph(s) 124. In the non-limiting example shown in FIG. 4, notifications 128 relating to the color of the articles of clothing to be worn by the user to be included in the captured photograph may be based on and/or determined by environmental data 126 and/or environmental data used to identify desirable photograph(s) 124. Specifically, environmental data 126 for location 118 at detectable time 120 may determine that location 118 may be clear (e.g., no rain) and partly cloudy. As a result, notifications 128 provide recommendations relating to the color for the articles of clothing to be worn by the user that may substantially contrast with the environment (e.g., sky, ground) and/or potential landmarks (e.g., tower of Pisa) at location 118 to avoid the user from undesirably blending into the picture. More specifically, notifications 128 may recommend colors other than "green," "blue" and/or "white," to avoid the user from blending into the grass, and/or sky at location 118.

Figure 5:
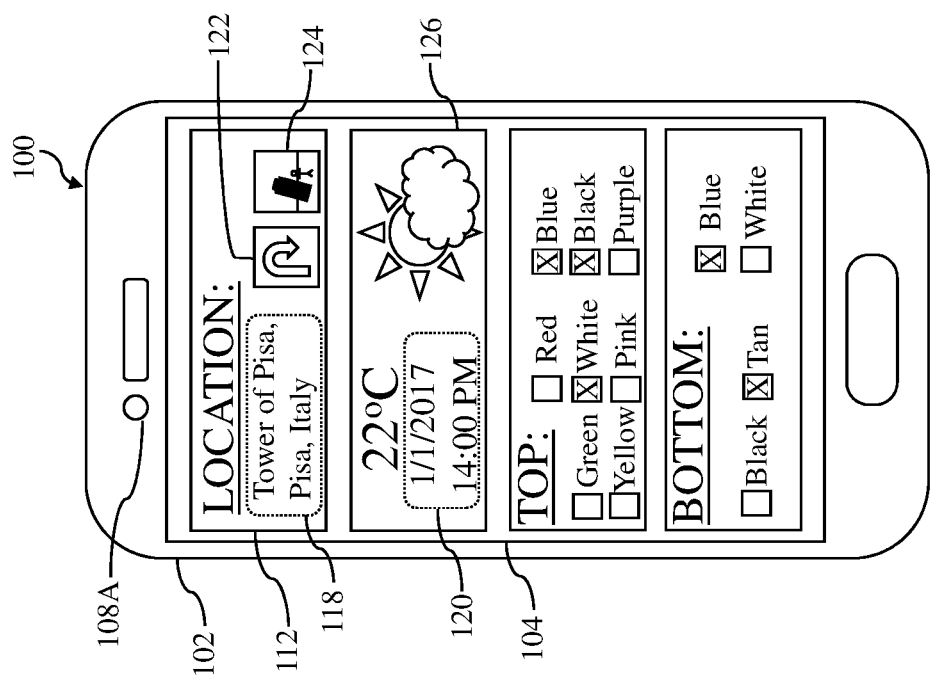
FIG. 5 depicts an illustrative front view of the electronic device of FIG. 1 displaying location information, environmental data and clothing information input by a user, according to embodiments.
Figure 6:
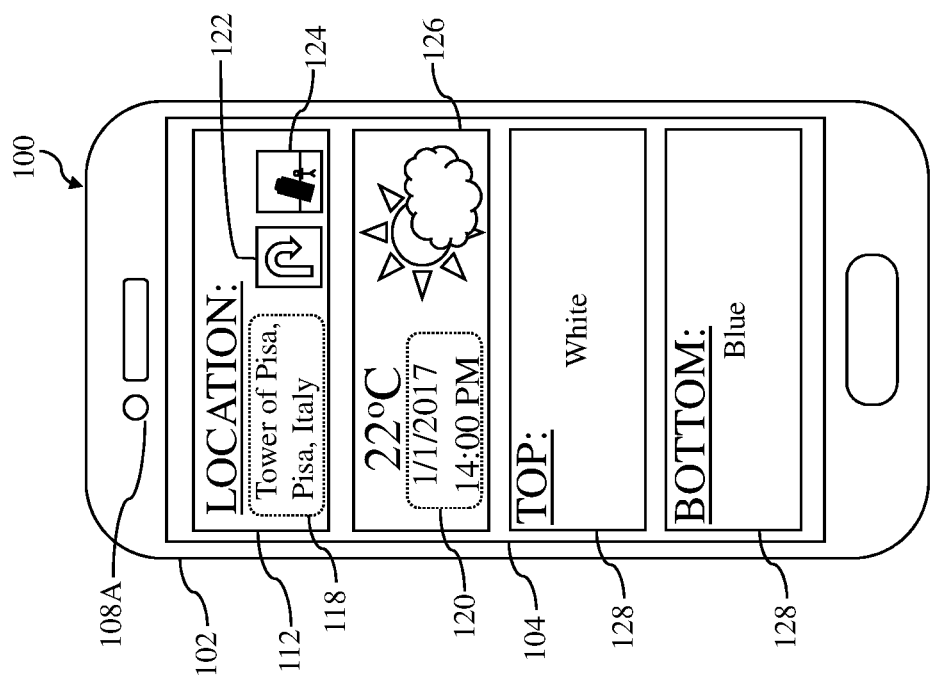
FIG. 6 depicts an illustrative front view of the electronic device of FIG. 1 displaying location information, environmental data and notifications, according to additional embodiments.

In another non-limiting example shown in FIGS. 5 and 6, a user may directly input their clothing options into electronic device 100, which may in turn provide a recommendation relating to the color of the clothing for the user. Specifically, as shown in FIG. 5, a user may directly input which color clothing they have prior to capturing a photograph at location 118 using electronic device 100. After analyzing electronic device data, location data 112, analyzed environmental data 126 and/or desirable photograph(s) 124, electronic device 100 may provide notifications 128 including specific recommendations relating to the color of the article of clothing to be worn by the user when capturing the photograph at location 118, based on the directly input information by the user. In the non-limiting example shown in FIG. 6, the notification 128 may only include one recommended color for each article of clothing to be worn by the user.

Turning to FIGS. 7-20, various non-limiting examples of processes for adjusting characteristics for a photograph to be captured by electronic device 100 at location 118 are shown. It is understood that similarly numbered and/or named components may function in a substantially similar fashion. Redundant explanation of these components has been omitted for clarity.

As discussed herein, notification 128 provided to a user on electronic device 100 may include a variety of notifications that may be based on various forms of information and/or data that is utilized to adjust characteristics of a photograph taken at location 118 by electronic device 100. In a non-limiting example shown in FIGS. 7 and 9, a notification displayed on touch display 104 of electronic device 100 may include a map 130 of location 118. Specifically, the notification provided on electronic device 100 may include interactive map 130 of location 118 prior to user 132 and/or electronic device 100 being located at identified location 118, or conversely, may include interactive map 130 of location 118 once user 132 and/or electronic device 100 are positioned at or adjacent identified location 118. Map 130 of location 118 may be generated, created and/or provided to electronic device 100 using any suitable application and/or system included within electronic device 100 including, but not limited to, a GPS application. It is understood that user 132 may include, but is not limited to, a user or person included within a photograph, a user or person operating electronic device 100 for capturing the photograph, and/or a person who is both in the photograph and operating electronic device 100 to capture the photograph (e.g., selfie, groufie).

Figure 7:
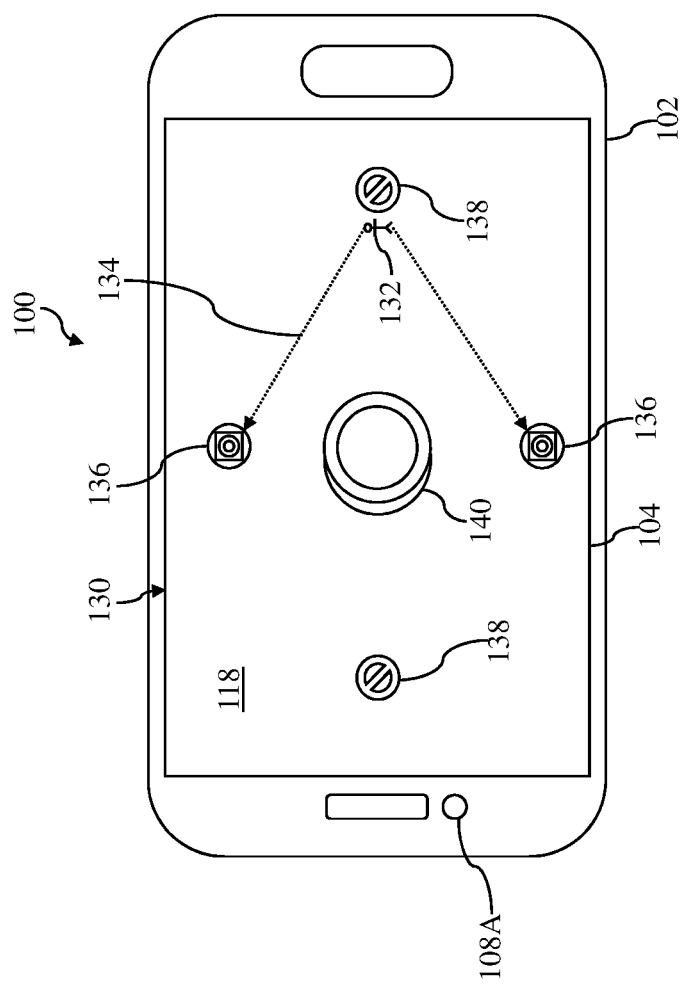
FIG. 7 depicts an illustrative front view of the electronic device of FIG. 1 displaying a map of an identified location including a landmark and a position of a user within the identified location, according to embodiments.
Figure 8:
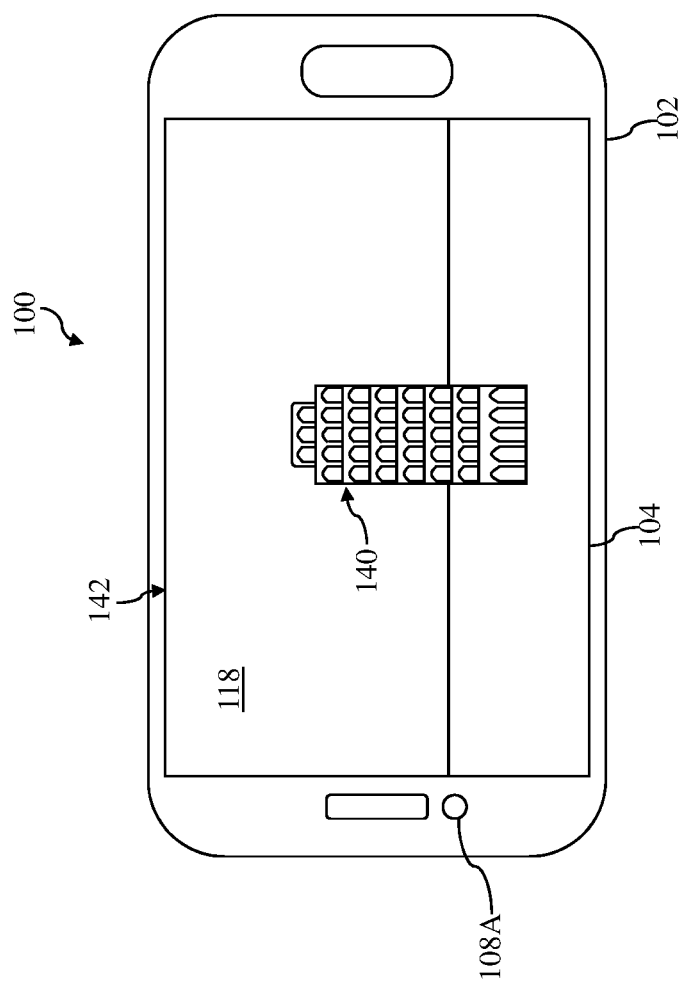
FIG. 8 depicts an illustrative front view of the electronic device of FIG. 1 displaying a real-time image of the landmark from a non-photogenic spot on the map of the identified location of FIG. 7, according to embodiments.

As shown in FIG. 7, interactive map 130 (e.g., notification) may provide directions 134 to user 132 of electronic device 100. Specifically, interactive map 130 may determine the position of user 132 at location 118 in real-time, and may provide directions 134 on touch display 104 of electronic device 100. In the non-limiting example shown in FIG. 7, directions 134 provided to user 132 may relate to predetermined photograph spots 136 within location 118. That is, directions 134 on map 130 may provide instructions and/or visual indicators (e.g., travel lines or arrows) to predetermined photograph spots 136 within location 118 so user 132 of electronic device 100 may be instructed to and/or may move toward predetermined photograph spots 136 for capturing a photograph. As discussed herein predetermined photograph spots 136 identified on map 130 of location 118 may be identified and/or determined based on the analyzed historical data for the collection of previously captured photographs and/or desirable photograph(s) 124 (see, FIG. 4).

Figure 9:
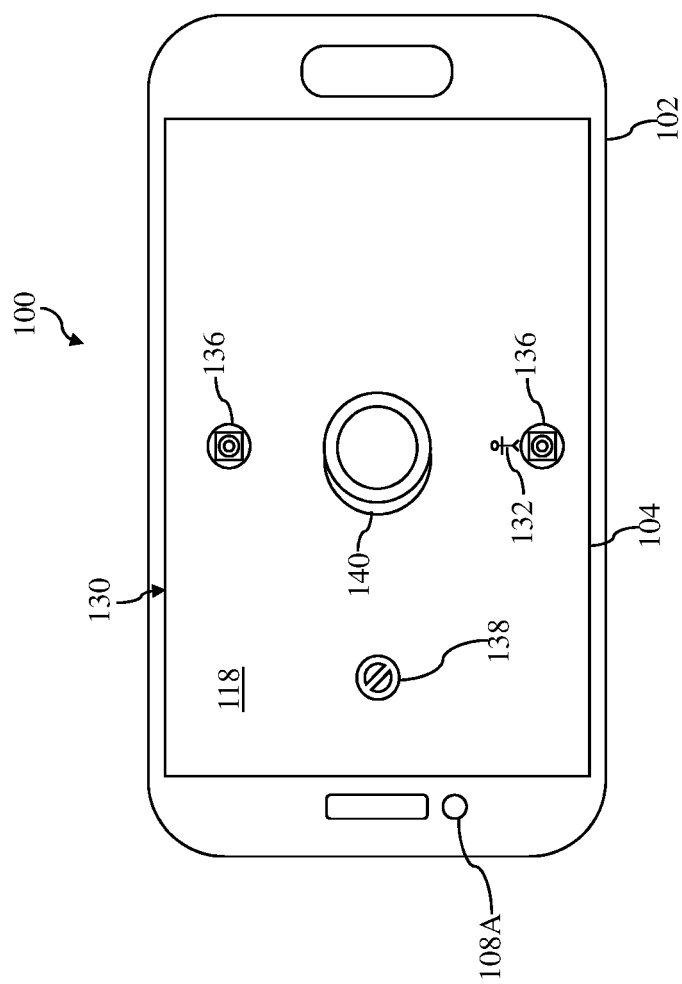
FIG. 9 depicts an illustrative front view of the electronic device of FIG. 1 displaying the map of FIG. 7 and the user positioned at a predetermined photograph spot within the identified location, according to embodiments.
Figure 10:
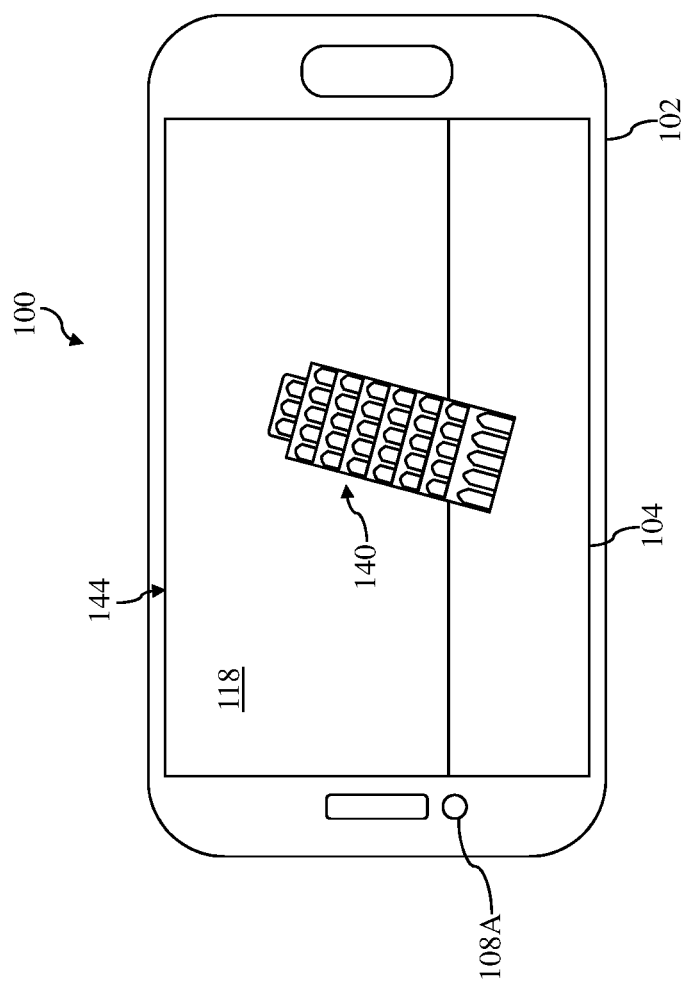
FIG. 10 depicts an illustrative front view of the electronic device of FIG. 1 displaying a captured photograph of the landmark from the predetermined photograph spot on the map of the identified location of FIG. 7, according to embodiments.

With reference to FIGS. 7-10, providing a notification, and specifically interactive map 130, and subsequently adjusting user 132 position at location 118 may now be discussed. As shown in FIG. 7, user 132 may originally be positioned at a non-photogenic spot 138 for location 118. Non-photogenic spot 138 may represent a spot or area in location 118 that may not produce a desirable and/or quality photograph at location 118 and/or with a landmark 140 at location 118. For example, user 132 may be located in Pisa, Italy (e.g., location 118) and it may be determined that user 132 would like to capture a photograph of the Tower of Pisa (e.g., landmark 140), commonly referred to as the leaning Tower of Pisa. Analyzed historical data and/or desirable photograph(s) 140 may determine that there are two predetermined photograph spots 136 on opposite sides of landmark 140 (e.g., Tower of Pisa), which may be identified, predetermined photograph spots 136 because photographs captured at these spots may most clearly depict the angle or "lean" of landmark 140. Briefly turning to FIG. 8, if user 132 remains at non-photogenic spot 138 and captures a photograph 142 of landmark 140 at non-photogenic spot 138, photograph 142 may not capture the angle or "lean" of landmark 140, and ultimately may be an undesirable photograph captured at location 118. As such, and based on desirable photograph(s) 140 and/or analyzed historical data, user 132 is recommended and/or provided a notification (e.g., interaction map 130, directions 134) to move to predetermined photograph spots 136. With reference to FIGS. 9 and 10, once user 132 has reached predetermined photograph spot 136 (see, FIG. 9), user 132 may capture a photograph 144 that may clearly and/or adequately depict the angle or "lean" of landmark 140 (see, FIG. 10). Photograph 144 depicted in FIG. 10, which may be captured using electronic device 100 at predetermined photograph spot 136 (see, FIG. 9) may improve user 132 satisfaction with photograph 144 captured at location 118.

Figure 11:
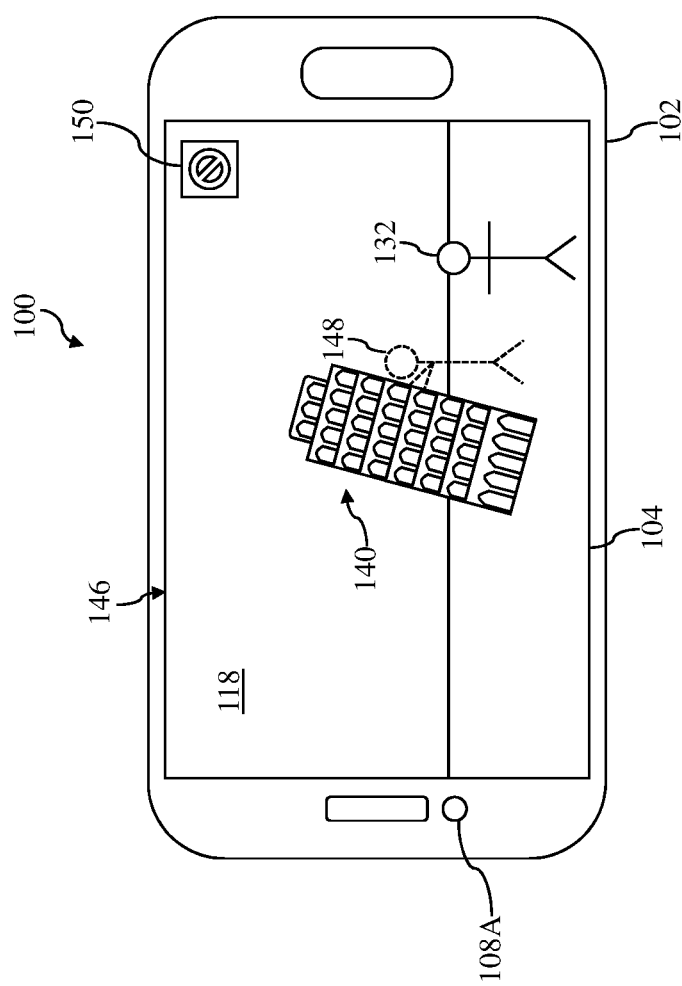
FIGS. 11 and 12 depict illustrative front views of the electronic device of FIG. 1 displaying a notification for adjust user characteristics for a user captured in a photograph at an identified location, according to embodiments.
Figure 12:
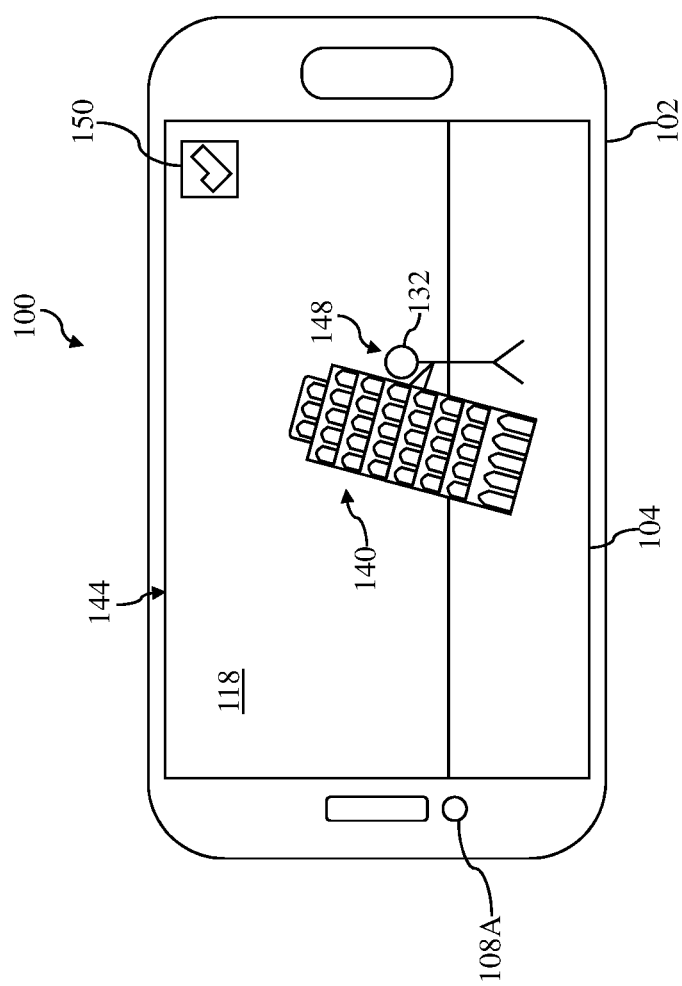

FIGS. 11 and 12 may depict another non-limiting example for adjusting characteristics of photograph 144 captured by electronic device 100 at location 118. Specifically, FIGS. 11 and 12 may depict a non-limiting example of providing a notification to electronic device 100 for adjusting user characteristic for user 132 captured in photograph 144 at location 118. Continuing the example from above, user 132 may be located in Pisa, Italy (e.g., location 118) and it may be determined that user 132 would like to capture a photograph of the Tower of Pisa (e.g., landmark 140). Desirable photograph(s) 124 (see, FIG. 4) at location 118 may determine and/or identify that previous captured photographs depict an illusion of the previous users "holding-up" or "pushing" on landmark 140 (e.g., Tower of Pisa). As such, electronic device 100 may provide a notification to user 132 and/or electronic device 100 to achieve a similar, desirable photograph at location 118. As shown in the real-time image 146 (e.g., image prior to capturing photograph 144) depicted on touch display 104, a user-silhouette notification 148 may be provide to electronic device 100 and/or also depicted on touch display 104. User-silhouette notification 148 may provide a recommended position for user 132 of electronic device 100 to achieve the desired photograph 144 (see, FIG. 12) to be captured by electronic device 100 at location 118. As shown in FIG. 12, once user 132 of electronic device 100 is positioned adjacent landmark 140 and/or is substantially aligned with user-silhouette notification 148, electronic device 100 may capture photograph 144 at location 118. Electronic device 100 may capture photograph 144 after being instructed to do so (e.g., button push), or alternatively, electronic device 100 may automatically capture photograph 144 after electronic device 100 detects and/or determines user 132 is positioned adjacent landmark 140 and/or is substantially aligned with user-silhouette notification 148.

Additionally, touch display 104 may also depict a photograph signal or indicator 150. Photograph indicator 150 may provide an indication or visual cue based on photograph 144 and/or user characteristics for user 132 to be captured in photograph 144. Specifically, photograph indicator 150 may provide a visual cue on touch display 104 of electronic device 100 to identify and/or reveal that a position or location of electronic device 100 is correct or incorrect and/or user characteristic(s) for user 132 is correct or incorrect in real-time image 146 and/or photograph 144. The visual cue provided by photograph indicator 150 may be based on various forms of information and/or data used, determined and/or analyzed to adjust characteristics of photograph 144 captured by electronic device 100, as discussed herein. In non-limiting examples, visual cues provided by photograph indicator 150 may be based on desirable photograph(s) 124, historical data for the collection of previously captured photographs, location information 112, environmental information 126, predetermined photograph spots 136 and/or user characteristic for user 132. As shown in FIG. 11, photograph indicator 150 may provide a disapproval visual cue (e.g., "Do Not" sign) on touch display 104, which may indicate that electronic device 100 is not ready to capture photograph 144 because user 132 may not be positioned adjacent landmark 140 and/or may not be substantially aligned with user-silhouette notification 148. Conversely, and as shown in FIG. 12, photograph indicator 150 may provide an approval visual cue (e.g., check mark) on touch display 104, which may indicate that electronic device 100 is ready to capture photograph 144 because user 132 may be positioned adjacent landmark 140 and/or may be substantially aligned with user-silhouette notification 148.

Figure 13:
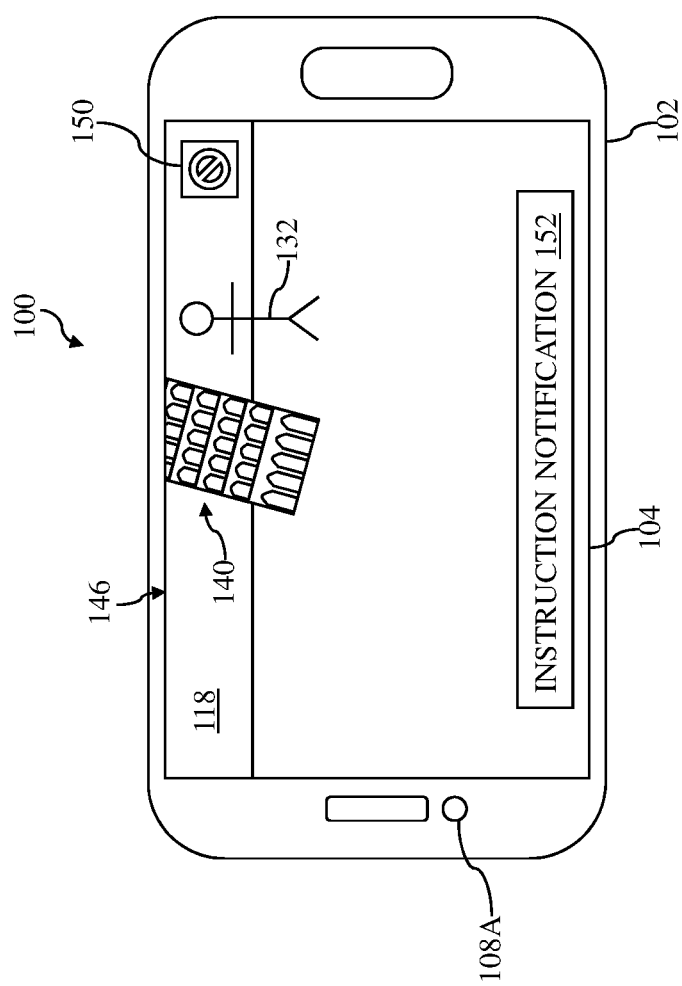
FIGS. 13 and 14 depict illustrative front views of the electronic device of FIG. 1 displaying a notification for adjust a position and/or location of the electronic device capturing a photograph at an identified location, according to embodiments.
Figure 14:
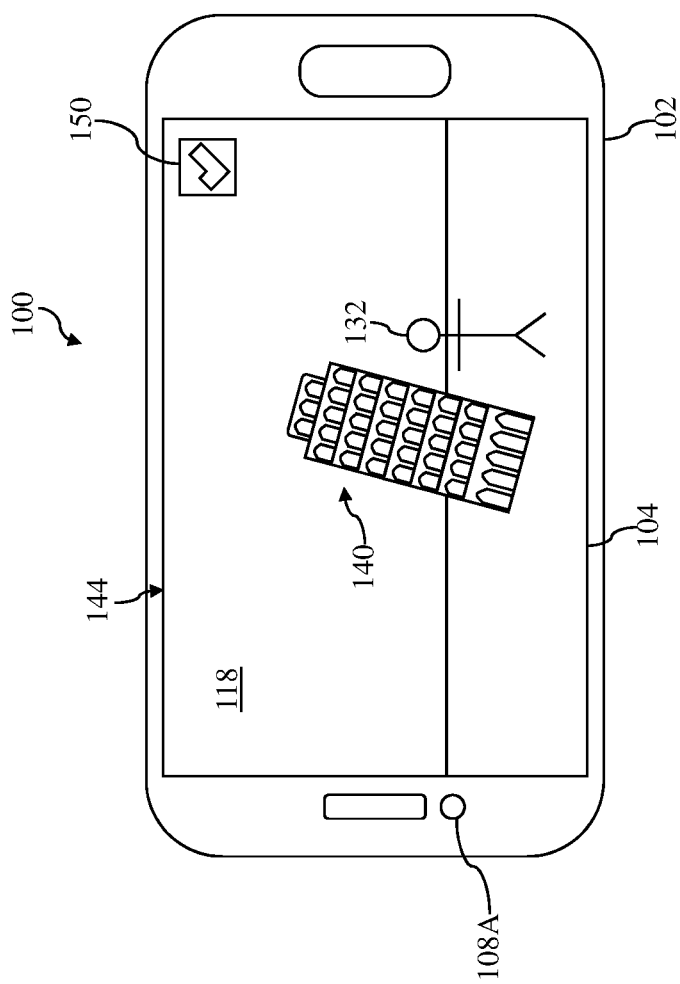

FIGS. 13 and 14 may depict another non-limiting example of providing a notification to electronic device 100 for adjusting a position, orientation and/or location for electronic device 100 capturing photograph 144 (see, FIG. 14) at location 118. Continuing the example from above, user 132 may be located in Pisa, Italy (e.g., location 118) and it may be determined that user 132 would like to capture a photograph of the Tower of Pisa (e.g., landmark 140). Desirable photograph(s) 124 (see, FIG. 4) at location 118 may determine and/or identify that previous captured photographs depict an entire view of landmark 140 (e.g., Tower of Pisa). As such, electronic device 100 may provide a notification to user 132 and/or electronic device 100 to achieve a similar, desirable photograph at location 118. As shown in the real-time image 146 depicted on touch display 104, a recommendation and/or instruction notification 152 may be provide to electronic device 100 and/or may be depicted on touch display 104. Instruction notification 152 may provide a recommendation or instructions for adjusting a position, orientation and/or location of electronic device 100 to achieve the desired photograph 144 (see, FIG. 14) at location 118.

In the non-limiting example shown in FIG. 13 where only a portion of landmark 140 is shown in real-time image 146, instruction notification 152 may provide a recommendation or instructions to adjust a position, orientation and/or location of electronic device 100 to ensure all of landmark 140 is captured in photograph 144. The recommendation or instructions included in instruction notification 152 may include, but is not limited to, recommending the electronic device 100 move further away from landmark 140, electronic device 100 be angled upward toward the top of landmark 140, electronic device 100 be rotated from a landscape view (e.g., sideways) to a portrait view (e.g., upright), the zoom of camera 108 of electronic device 100 be adjusted (e.g., zoom out), and other such adjustments to electronic device 100 that may allow photograph 144 to capture all of landmark 140. Once the position, orientation and/or location of electronic device 100 are adjusted according to instruction notification 152, photograph 144 may be captured at location 118 (see, FIG. 14). As similarly discussed herein with respect to FIGS. 11 and 12, photograph indicators 150 may be utilized and/or depicted on touch display 104 of electronic device 100 to help with identifying when the position, orientation and/or location of electronic device 100 is properly and/or desirably adjusted according to instruction notification 152.

Figure 15:
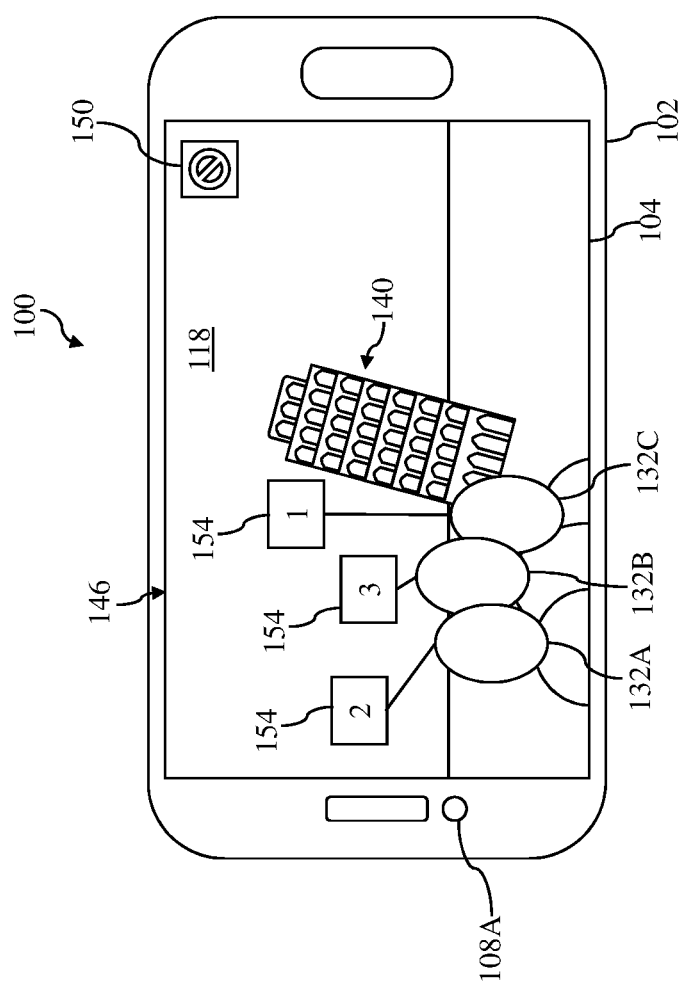
FIGS. 15 and 16 depict illustrative front views of the electronic device of FIG. 1 displaying a notification for adjust user characteristics for users captured in a photograph at an identified location, according to additional embodiments.
Figure 16:
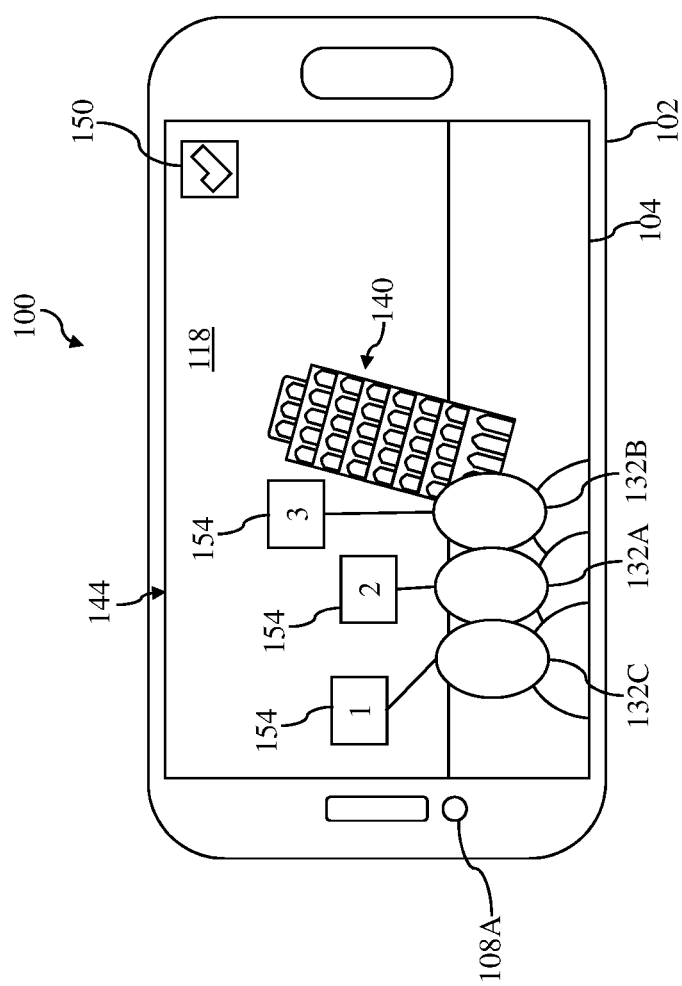

FIGS. 15 and 16 may depict another non-limiting example of providing a notification to electronic device 100 for adjusting user characteristic for users 132A-132C captured in photograph 144 at location 118. Specifically, FIGS. 15 and 16 may depict a non-limiting example of providing a notification to electronic device 100 for adjusting a position, orientation, order and/or location for users 132A-132C captured in photograph 144 (see, FIG. 16) at location 118. As discussed herein, desirable photograph(s) 124 (see, FIG. 4) may determine and/or identify that multiple users in the previous captured photographs may be ordered by ascending height, so each user of the previously captured photographs appears to be the same height and/or is not cut out of the photograph. Specifically, taller users shown in the previous captured photographs may be positioned further away from the electronic device used to capture the photograph included within desirable photograph(s) 124, while shorter users may be positioned closer to the electronic device. As such, electronic device 100 may provide a notification to users 132A-132C and/or electronic device 100 to achieve a similar, desirable photograph at location 118. As shown in the real-time image 146 depicted on touch display 104, a user positioning notification 154 may be provide to electronic device 100 and/or may be depicted on touch display 104. User positioning notification 154 may provide a recommendation or instructions for adjusting a position, orientation, order and/or location for each user 132A-132C to achieve the desired photograph 144 (see, FIG. 14) at location 118.

In the non-limiting example shown in FIG. 15, user positioning notification 154 may visually provide and/or assign each user 132A-132C with an order number (e.g., 1, 2, 3 and so on), and may depict the order number on touch display 104 of electronic device 100. Users 132A-132C may then adjust their position, orientation, order and/or location within real-time image 146 so they are aligned sequentially, based on user positioning notification 154. For example, user 132C may be assigned order number "1" by user positioning notification 154, because user 132C may be identified by electronic device 100 as the shortest user. Additionally, user 132B may be assigned order number "3" by user positioning notification 154, because user 132B may be identified as the tallest user in real-time image 146. Once the position, orientation, order and/or location of users 132A-132C are adjusted according to user positioning notification 154, photograph 144 may be captured at location 118 (see, FIG. 15). As similarly discussed herein with respect to FIGS. 11 and 12, photograph indicators 150 may be utilized and/or depicted on touch display 104 of electronic device 100 to help with identifying when the position, orientation, order and/or location of users 132A-132C is properly and/or desirably adjusted according to user positioning notification 154.

Figure 17:
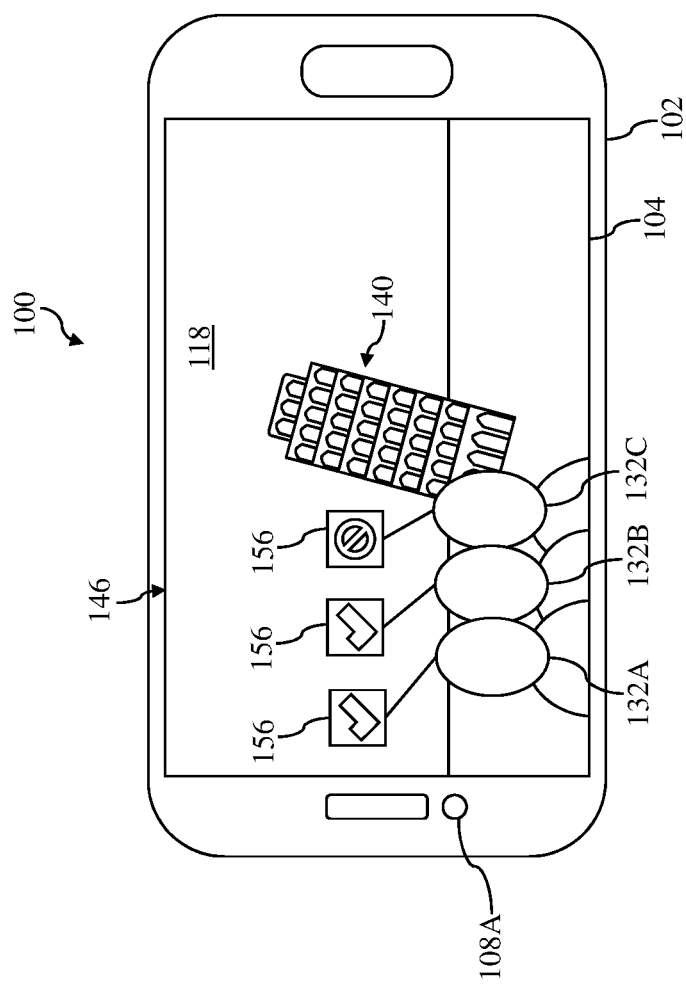
FIGS. 17 and 18 depict illustrative front views of the electronic device of FIG. 1 displaying a notification for adjust user characteristics for users captured in a photograph at an identified location, according to further embodiments.
Figure 18:
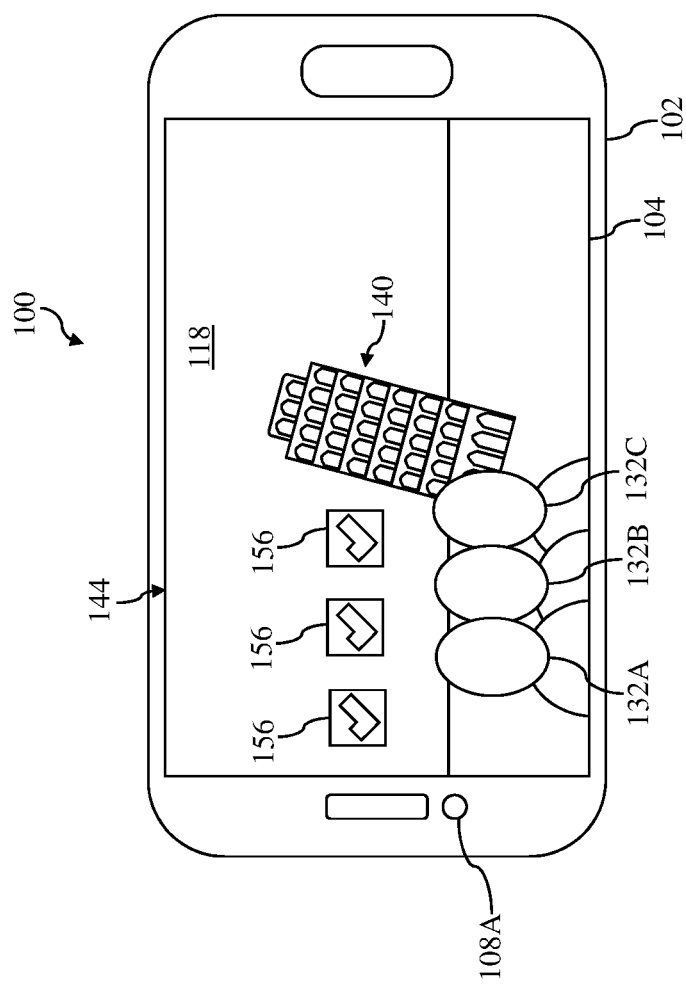

FIGS. 17 and 18 may depict another non-limiting example of providing a notification to electronic device 100 for adjusting user characteristic for users 132A-132C captured in photograph 144 at location 118. Specifically, FIGS. 17 and 18 may depict a non-limiting example of providing a notification to electronic device 100 for adjusting a facial expression and/or action for users 132A-132C captured in photograph 144 (see, FIG. 16) at location 118. Desirable photograph(s) 124 (see, FIG. 4) may determine and/or identify that multiple users in the previous captured photographs may all be looking, focusing on and/or smiling at the electronic device used to capture the photograph included within desirable photograph(s) 124. As such, electronic device 100 may provide a notification to users 132A-132C and/or electronic device 100 to achieve a similar, desirable photograph at location 118. As shown in the real-time image 146 depicted on touch display 104, a user action notification 156 may be provide to electronic device 100 and/or may be depicted on touch display 104. User action notification 156 may indicate whether all users 132A-132C have desirable and/or similar facial expressions and/or all users 132A-132C are looking at camera 108 of electronic device 100 when attempting to capture the desired photograph 144 (see, FIG. 18) at location 118. User action notification 156 may be substantially similar to photograph indicator 150, in that, user action notification 156 may provide a visual cue (e.g., disapproval, approval) for each user 132A-132C based on user's facial expression, camera focus and/or action. In the non-limiting example shown in FIG. 17, users 132A, 132B may be focused on, looking and/or smiling at electronic device 100. As such, user action notification 156 for users 132A, 132B may be an approval visual cue (e.g., check mark). However, in the non-limiting example, user 132C may not be focused on, looking and/or smiling at electronic device 100. As a result, user action notification 156 for user 132C may be a disapproval visual cue (e.g., "Do Not" sign), indicating that electronic device should not capture the photograph. Once all users 132A-132C are focused on, looking and/or smiling at electronic device 100, and user action notification 156 indicates the same (e.g., all user action notifications 156 include approval visual cues), photograph 144 may be captured at location 118 (see, FIG. 18).

Figure 19:
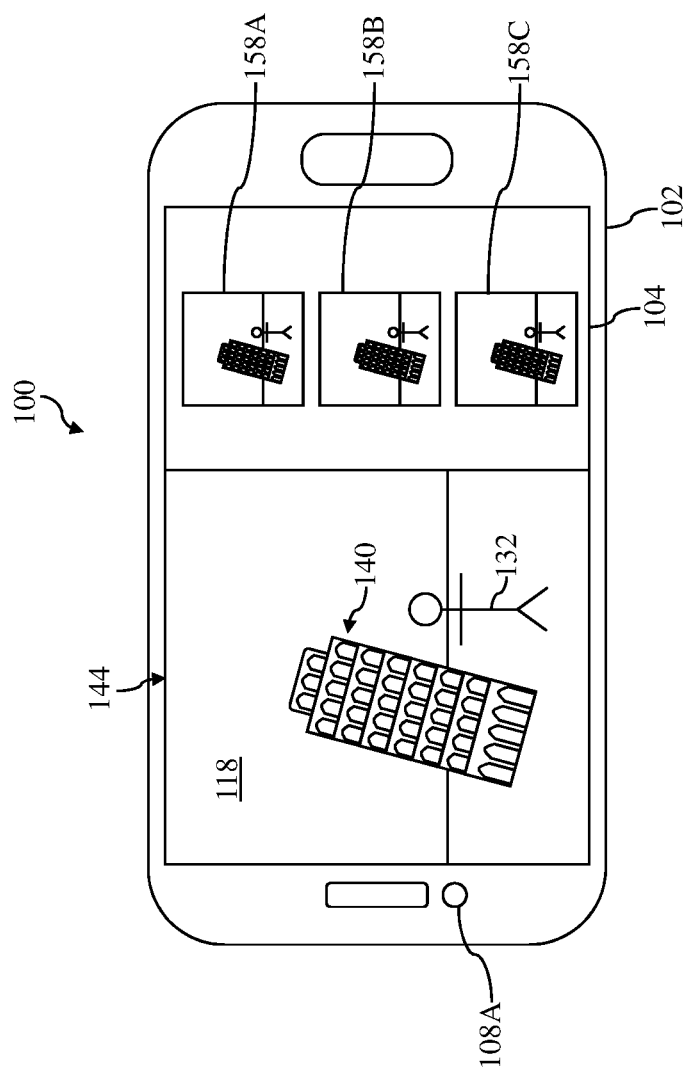
FIG. 19 depicts an illustrative front view of the electronic device of FIG. 1 adjusting camera settings for a photograph captured at an identified location, according to embodiments.
Figure 20:
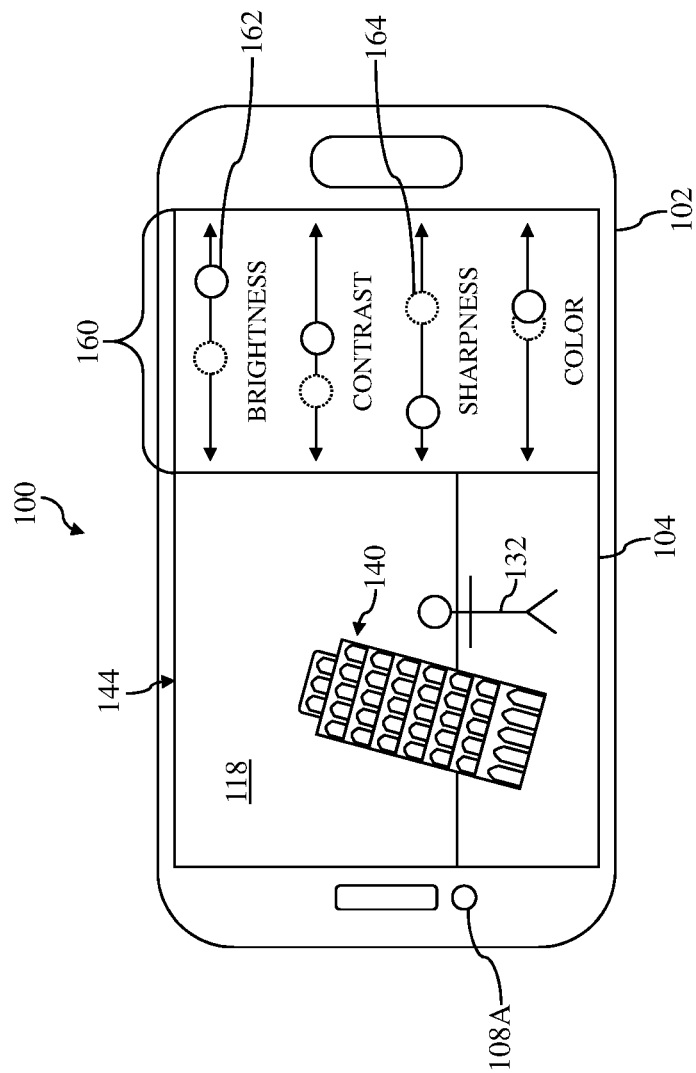
FIG. 20 depicts an illustrative front view of the electronic device of FIG. 1 adjusting camera settings for a photograph captured at an identified location, according to additional embodiments.

FIGS. 19 and 20 may depict another non-limiting example for adjusting characteristics of photograph 144 captured by electronic device 100 at location 118. Specifically, FIGS. 19 and 20 may depict a non-limiting example of adjusting at least one camera setting 158, 160 for camera 108 of electronic device 100. As discussed herein, adjusting at least one camera setting 158, 160 for camera 108 of electronic device 100 configured to capture photograph 144 at location 118 may be based on a variety of information and/or data analyzed, identified, detect and/or generated by electronic device 100. That is, adjusting at least one camera setting 158, 160 for camera 108 of electronic device 100 may be based on location data 112 including identified location 118, desirable photograph(s) 124 and the associated, analyzed or evaluated data (user-interaction data, environmental data and/or historical data) for desirable photograph(s) 124, environmental data 126, and/or the various notifications and associated data provided to electronic device 100 (e.g., clothing color notification 128, map 130, user-silhouette notification 148, photograph indicator 150, instruction notification 152, user positioning notification 154 and/or user action notification 156).

In a non-limiting example shown in FIG. 19, adjusting at least one camera setting 158, 160 for camera 108 of electronic device 100 may include applying a filter 158A-158C to camera 108 of electronic device 100. More specifically, once photograph 144 is captured at location 118 using electronic device 100, or alternatively while photograph is being captured, at least one filter 158A-158C may be applied to camera 108 and/or captured photograph 144. Filters 158A-158C may be applied to camera 108 and/or captured photograph 144 automatically by electronic device 100, or alternatively, may be selected by a user (e.g., user 132) capturing photograph 144 using electronic device 100. As discussed herein, filters 158A-158C may be based on a variety of information and/or data relating to electronic device 100, photograph 144 and/or location 118. For example, filters 158A-158C may be determined based on desirable photograph(s) 124, and specifically, identified and/or detected camera settings for desirable photograph(s) 124. That is, filters 158A-158C may mimic and/or may be identical to detected filters and/or camera settings used when capturing desirable photograph(s) 124 at location 118. In another non-limiting example, filters 158A-158C may be based on environmental data 126 (e.g., weather information). Specifically, where environmental data 126 indicates that location 118 at detectable time 120 is mostly cloudy and/or low on natural light due to cloudy coverage, filters 158A-158C may substantially brighten photograph 144.

In another non-limiting example shown in FIG. 20, adjusting at least one camera setting 158, 160 for camera 108 of electronic device 100 may include adjusting image factors 160 for photograph 144 captured at location 118 by camera 108 of electronic device 100. More specifically, once photograph 144 is captured at location 118 using electronic device 100, or alternatively while photograph is being captured, at least one image factor 160 may be adjusted on electronic device 100 and/or photograph 144. As discussed herein, and as shown in FIG. 20, image factors 160 may include brightness, contrast, sharpness, color and/or any other suitable characteristic and/or image factor that may alter or adjust the characteristics of photograph 144. Image factors 160 may be adjusted automatically by electronic device 100, or alternatively, may be adjusted by a user (e.g., user 132) capturing photograph 144 using electronic device 100. In a non-limiting example shown in FIG. 20, image factors 160 may include adjusted values 162 for each image factor and previous values 164 (shown in phantom). In the non-limiting example, adjusted values 162 may represent the new, adjusted and/or altered value for each image factor 160 based on based on a variety of information and/or data relating to electronic device 100, photograph 144 and/or location 118. Additionally, previous values 164 may represent the values for image factors 160 before adjusting image factors 160 (e.g., actual values 162).

As discussed herein, adjusting image factors 160 may be based on a variety of information and/or data relating to electronic device 100, photograph 144 and/or location 118. Similar to the examples discussed above with respect to filters 158A-158C, image factors 160 may be adjusted (e.g., actual values 162) based on desirable photograph(s) 124, and specifically, identified and/or detected camera settings for desirable photograph(s) 124. That is, image factors 160 may be adjusted to mimic and/or be identical to detected camera settings and/or image factors for desirable photograph(s) 124 at location 118. In another non-limiting example, image factors 160 may be based on and adjusted in view of environmental data 126 (e.g., weather information). Specifically, where environmental data 126 indicates that location 118 at detectable time 120 is mostly cloudy and/or low on natural light due to cloudy coverage, image factors 160 for electronic device 100 may be adjusted to substantially brighten photograph 144 captured by electronic device 100 at location 118.

Figure 21:
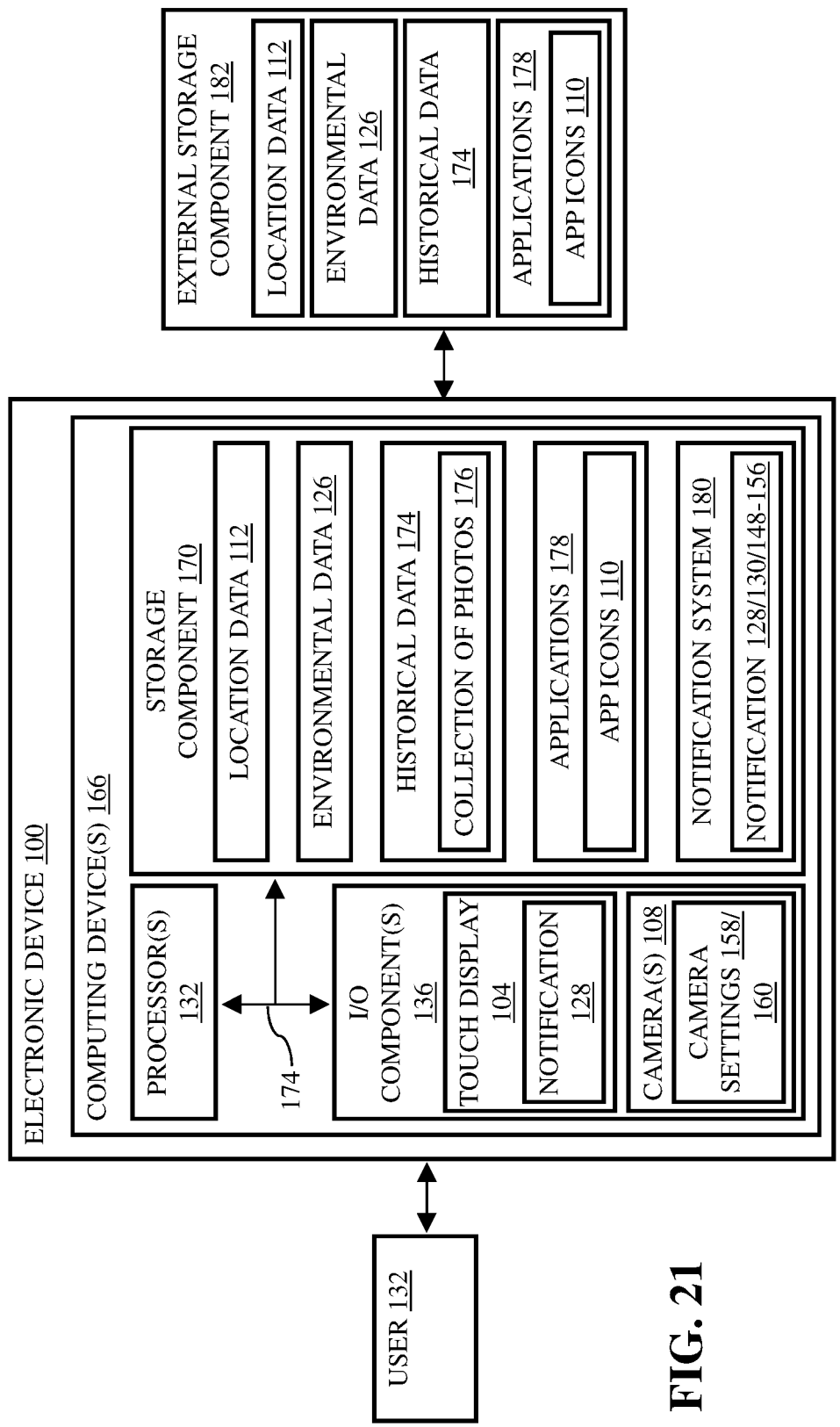
FIG. 21 depicts a schematic view of an electronic device configured to adjust characteristics of a photograph captured by the electronic device, according to embodiments.

FIG. 21 depicts a schematic view of electronic device 100, and the various components included within electronic device 100. In the non-limiting example shown in FIG. 21, electronic device 100 may include at least one computing device 166 that may be configured to adjust characteristics of photographs 144 captured at location 118 by electronic device 100. It is understood that similarly numbered and/or named components may function in a substantially similar fashion. Redundant explanation of these components has been omitted for clarity.

It is understood that computing device(s) 166 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Electronic device 100 may include any type of computing device(s) 166 and for example includes at least one processor 168, storage component 170, input/output (I/O) component(s) 172 (including touch display 104 and camera(s) 108), and a communications pathway 174. In general, processor(s) 168 execute program code which is at least partially fixed in storage component 170. While executing program code, processor(s) 168 can process data, which can result in reading and/or writing transformed data from/to storage component 170 and/or I/O component(s) 172 for further processing. The pathway 140 provides a communications link between each of the components in computing device(s) 166. I/O component 172 can comprise one or more human I/O devices, which enable a user to interact with computing device(s) 166. Computing device(s) 166 may also be implemented in a distributed manner such that different components reside in different physical locations.

Storage component 170 may also include modules, data and/or electronic information relating to various other aspects of electronic device 100. Specifically, operational modules and/or data relating to location data 112, environmental data 126, and historical data 174 including a collection of previously captured photographs 176 which further includes desirable photograph(s) 124 (see, FIG. 4). Additionally, storage component 170 may also include operational modules and/or data relating to applications 178 for electronic device 100, including the associated application icons 110, and notification system 180 which includes and/or provides notifications 128, 130, 148-156 to touch display 104 (only notification 128 shown), as discussed herein.

Electronic device 100, and specifically computing device 166 of electronic device 100, may also be in communication with an external storage component 182. External storage component 182 may be configured to store various modules, data and/or electronic information relating to various other aspects of electronic device 100, similar to storage component 170 of computing device(s) 166. Additionally, external storage component 152 may be configured to share (e.g., send and receive) data and/or electronic information with computing device(s) 166 of electronic device 100. In the non-limiting example shown in FIG. 21, external storage component 152 may include operational modules and/or data relating to location data 112, environmental data 126, historical data 174 and/or applications 178. In a non-limiting example, external storage component 182 may be a cloud-based storage component or system.

Furthermore, it is understood that computing device(s) 166 of electronic device 100 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, and then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method comprising:
    identifying a location of an electronic device at a detectable time, the electronic device including a camera configured to capture a photograph at the location;
    analyzing environmental data relating to the identified location;
    analyzing historical data for a collection of previously captured photographs at the identified location;
    providing at least one notification on the electronic device based on at least one of:
        the analyzed environmental data, or
        the analyzed historical data; and
    adjusting at least one camera setting for the camera of the electronic device based on the analyzed environmental data and the analyzed historical data;
    wherein analyzing the historical data includes:
    evaluating the collection of previously captured photographs at the identified location based on user-interaction data with the collection of previously captured photographs;
    identifying at least one desirable photograph of the collection of previously captured photographs at the identified location;
    identifying a predetermined photograph spot within the identified location based on the at least one identified, desirable photographs;
    detecting user characteristics for at least one user of the at least one identified, desirable photographs; and
    detecting camera settings for the at least one identified, desirable photographs;
    and wherein providing the at least one notification on the electronic device includes at least one:
        providing directions to the predetermined photograph spot within the identified location, or
        providing instructions for adjusting the user characteristic for at least one user to be captured in the photograph at the identified location.

2. The method of claim 1, wherein identifying the location of the electronic device at the detectable time includes:
    determining the location of the electronic device in real-time or at a scheduled time based on electronic device data.

3. The method of claim 1, wherein analyzing the environmental data includes:
    determining weather information relating to the location at the detectable time.

4. The method of claim 1, wherein providing instructions for adjusting the user characteristic includes:
    recommending at least one color for an article of clothing to be worn by the at least one user.

5. The method of claim 1, wherein providing instructions for adjusting the user
    characteristic includes at least one of:
        recommending an adjustment in position for the at least one user, or
        recommending an adjustment in an appearance for the at least one user.

6. The method of claim 1, wherein adjusting camera settings for the camera of the electronic device includes at least one of:
    adjusting image factors for the camera of the electronic device, or
    applying a filter to the camera of the electronic device.

7. A computer program product stored on a computer readable storage medium, which when executed by a computing system, adjusts a characteristic of a photograph captured by an electronic device, the program product comprising:
    program code that identifies a location of an electronic device at a detectable time, the electronic device including a camera configured to capture a photograph at the location;
    program code that analyzes environmental data relating to the identified location;
    program code that analyzes historical data for a collection of previously captured photographs at the identified location;
    program code that provide at least one notification on the electronic device based on at least one of:
        the analyzed environmental data, or
        the analyzed historical data; and
    program code that adjust at least one camera setting for the camera of the electronic device based on the analyzed environmental data and the analyzed historical data;
    wherein analyzing the historical data includes:
    evaluating the collection of previously captured photographs at the identified location based on user-interaction data with the collection of previously captured photographs;
    identifying at least one desirable photograph of the collection of previously captured photographs at the identified location;
    identifying a predetermined photograph spot within the identified location based on the at least one identified, desirable photographs;
    detecting user characteristics for at least one user of the at least one identified, desirable photographs; and
    detecting camera settings for the at least one identified, desirable photographs;
    and wherein providing the at least one notification on the electronic device includes at least one:
        providing directions to the predetermined photograph spot within the identified location, or
        providing instructions for adjusting the user characteristic for at least one user to be captured in the photograph at the identified location.

8. The program product of claim 7, wherein the program code identifies the location of the electronic device at the detectable time by:
    determining the location of the electronic device in real-time or at a scheduled time based on electronic device data.

9. The program product of claim 7, wherein the program code analyzes the environmental data by:
    determining weather information relating to the location at the detectable time.

10. The program product of claim 7, wherein providing instructions for adjusting the user characteristic includes:
   recommending at least one color for an article of clothing to be worn by the at least one user.

11. The program product of claim 7, wherein providing instructions for adjusting the user characteristic includes at least one of:
   recommending an adjustment in position for the at least one user, or
   recommending an adjustment in an appearance for the at least one user.

12. The program product of claim 7, wherein the program code adjusts camera settings for the camera of the electronic device by at least one of:
   adjusting image factors for the camera of the electronic device, or
   applying a filter to the camera of the electronic device.

13. A computerized method that adjusts a characteristic of a photograph captured by an electronic device, the method comprising:
   identifying a location of an electronic device at a detectable time, the electronic device including a camera configured to capture a photograph at the location;
   analyzing environmental data relating to the identified location;
   analyzing historical data for a collection of previously captured photographs at the identified location;
   providing at least one notification on the electronic device based on at least one of:
      the analyzed environmental data, or
      the analyzed historical data; and
   adjusting at least one camera setting for the camera of the electronic device based on the analyzed environmental data and the analyzed historical data;
   wherein analyzing the historical data includes:
      evaluating the collection of previously captured photographs at the identified location based on user-interaction data with the collection of previously captured photographs;
      identifying at least one desirable photograph of the collection of previously captured photographs at the identified location;
      identifying a predetermined photograph spot within the identified location based on the at least one identified, desirable photographs;
      detecting user characteristics for at least one user of the at least one identified, desirable photographs; and
      detecting camera settings for the at least one identified, desirable photographs;
   and wherein providing the at least one notification on the electronic device includes at least one:
      providing directions to the predetermined photograph spot within the identified location, or
      providing instructions for adjusting the user characteristic for at least one user to be captured in the photograph at the identified location.

14. The computerized method of claim 13, wherein analyzing the environmental data includes:
   determining weather information relating to the location at the detectable time.

* * * * *